United States Patent [19]

Falconer

[11] 4,181,888
[45] Jan. 1, 1980

[54] FEEDBACK NONLINEAR EQUALIZATION OF MODULATED DATA SIGNALS

[75] Inventor: David D. Falconer, Red Bank, N.J.

[73] Assignee: Bell Telephone Laboratories, Incorporated, Murray Hill, N.J.

[21] Appl. No.: 931,025

[22] Filed: Aug. 4, 1978

[51] Int. Cl.$^2$ .............................................. H04B 1/16
[52] U.S. Cl. ........................................ 325/42; 325/65;
 325/321; 325/323; 333/18
[58] Field of Search ...................... 325/41, 42, 65, 320,
 325/321, 323, 473, ; 178/88; 333/17, 18;
 328/155, 162

[56] References Cited

U.S. PATENT DOCUMENTS

| | | | |
|---|---|---|---|
| 3,231,819 | 1/1966 | Aaron | 328/65 |
| 3,434,056 | 3/1969 | Becker | 325/65 |
| 3,600,681 | 8/1971 | Arbuckle | 325/42 |
| 3,783,386 | 1/1974 | Sato | 325/321 |
| 3,868,603 | 2/1975 | Guidoux | 325/42 |
| 3,878,468 | 4/1975 | Falconer | 325/320 |
| 3,879,664 | 4/1975 | Monsen | 325/321 |
| 3,969,674 | 7/1976 | Tracey | 325/42 |
| 3,974,449 | 8/1976 | Falconer | 325/321 |
| 4,021,738 | 5/1977 | Gitlin | 325/42 |
| 4,053,837 | 10/1977 | Ryan | 333/18 |
| 4,097,807 | 6/1978 | Fujimura | 325/42 |

OTHER PUBLICATIONS

Lawless, et al. "Binary Signalling over Channels Containing Quadratic Nonlinearities" Mar. 1974 IEEE transaction on Comm. vol. Com-22 #3 pp. 288-298.
Falconer et al. "Theory of Minimum Mean-Square-Error QAM Systems Employing Decision Feedback Equalization" Bell System Technical Journal, vol. 52 #10 Dec. 1973 pp. 1821-1849.

*Primary Examiner*—Robert L. Griffin
*Assistant Examiner*—Michael A. Masinick
*Attorney, Agent, or Firm*—RonaldD. Slusky

[57] ABSTRACT

A receiver for a quadrature amplitude modulated data signal impaired by linear and nonlinear distortion, phase jitter and additive noise includes circuitry which compensates for these impairments. In particular, the receiver includes a processor (FIG. 1 44; FIG. 2, 44')which subtracts a feedback nonlinear signal (FIG. 1, D(n); FIG. 2, D'(n)) from each sample of the received signal, either prior or subsequent to demodulation, providing compensation for nonlinear intersymbol interference. The feedback nonlinear signal subtracted from each sample is comprised of a weighted sum of products of individual data decisions and/or the complex conjugates of data decisions, each such product, in turn, being multiplied by a predetermined harmonic of the carrier frequency. In an illustrative embodiment, compensation for second- and third-order intersymbol interference is provided by including two- and three-multiplicand weighted products in the feedback nonlinear signal. Weighting coefficients for each product are adaptively updated in a decision-directed manner.

31 Claims, 4 Drawing Figures

FIG. I

FEEDBACK NONLINEAR EQUALIZATION OF MODULATED DATA SIGNALS

CROSS-REFERENCE TO RELATED APPLICATION

My U.S. patent application entitled "Feedforward Nonlinear Equalization of Modulated Data Signals", Ser. No. 931,026, was filed in the U.S. Patent and Trademark Office concurrently herewith.

BACKGROUND OF THE INVENTION

My invention relates to the correction of the distorting effects of limited bandwidth transmission media on modulated data signals.

The principal impediment to accurate reception of high-speed data signals transmitted over limited bandwidth, e.g., switched voiceband telephone, transmission channels is that form of distortion known as intersymbol interference. This phenomenon is a manifestation of the fact that a pulse passing through a band-limited channel expands in the time domain. As a result, each sample of the received signal is not simply derived from a single transmitted data symbol but, rather, some combination of symbols. Other impairments include phase jitter and additive noise.

Linear intersymbol interference, in particular, is manifested in that each sample of the received signal contains a linear combination of a transmitted symbol—which the sample nominally represents—with symbols which precede and succeed it in the data stream. Among known techniques which compensate for the distorting effects of linear intersymbol interference in both baseband and passband, e.g., quadrature amplitude modulated (QAM), signals are linear feedforward equalization and linear decision feedback equalization. In accordance with the former technique, each sample of the received signal is weighted with a linear sum of past and future samples prior to a decision being made as to the value of the transmitted symbol. In accordance with the latter technique, a weighted linear sum of past decisions is combined with each sample, again prior to a decision being made as to the value of the transmitted symbol. See, for example, my U.S. Pat. No. 3,974,449 issued Aug. 10, 1976.

Nonlinear intersymbol interference is manifested in that each sample of the received signal includes a linear combination of products of the current, past and future modulated data symbols, and/or (in the case of QAM, for example) the complex conjugates of such data symbols. In transmission systems that employ linear modulation, such as QAM, the effect is to reduce the margin against noise. Indeed, for data rates above 4800 bps, nonlinear distortion is the dominant impairment on many voiceband channels. At least one arrangement is known which compensates for nonlinear intersymbol interference in baseband data signals. See, e.g., U.S. Pat. No. 3,600,681 issued Aug. 17, 1971 to T. Arbuckle. However, the known arrangements will not, in general, effectively compensate for nonlinear intersymbol interference in modulated data signals.

SUMMARY OF THE INVENTION

An object of my invention is to provide a method and arrangement which compensates for nonlinear intersymbol interference in modulated data signals.

A more particular object of my invention is to provide a method and arrangement which compensates for nonlinear intersymbol interference in modulated data signals in which both the carrier phase and amplitude are modulated, i.e., information-bearing.

A still more particular object of my invention is to provide a method and arrangement which compensates for nonlinear intersymbol interference in quadrature amplitude modulated data signals.

In accordance with the invention, the above and other objects are achieved by combining with each sample of the received signal an associated feedback nonlinear signal. The feedback nonlinear signal includes a weighted sum of products of (a) data decisions made on individual demodulated samples, and (b) complex conjugates of such data decisions. Each data decision/complex conjugate product, in turn, modulates a predetermined harmonic of the carrier frequency.

Each data decision/complex conjugate product has a predetermined number of multiplicands, i.e., data decisions and/or complex conjugates, each of which bears a predetermined temporal relationship to the associated sample. In general, inclusion in the feedback nonlinear signal of products having a total of m data decisions and complex conjugates provides compensation for $m^{th}$ order intersymbol interference.

The coefficients used in weighting the various products are illustratively updated in an adaptive, decision-directed manner.

DETAILED DESCRIPTION

Figure 1:
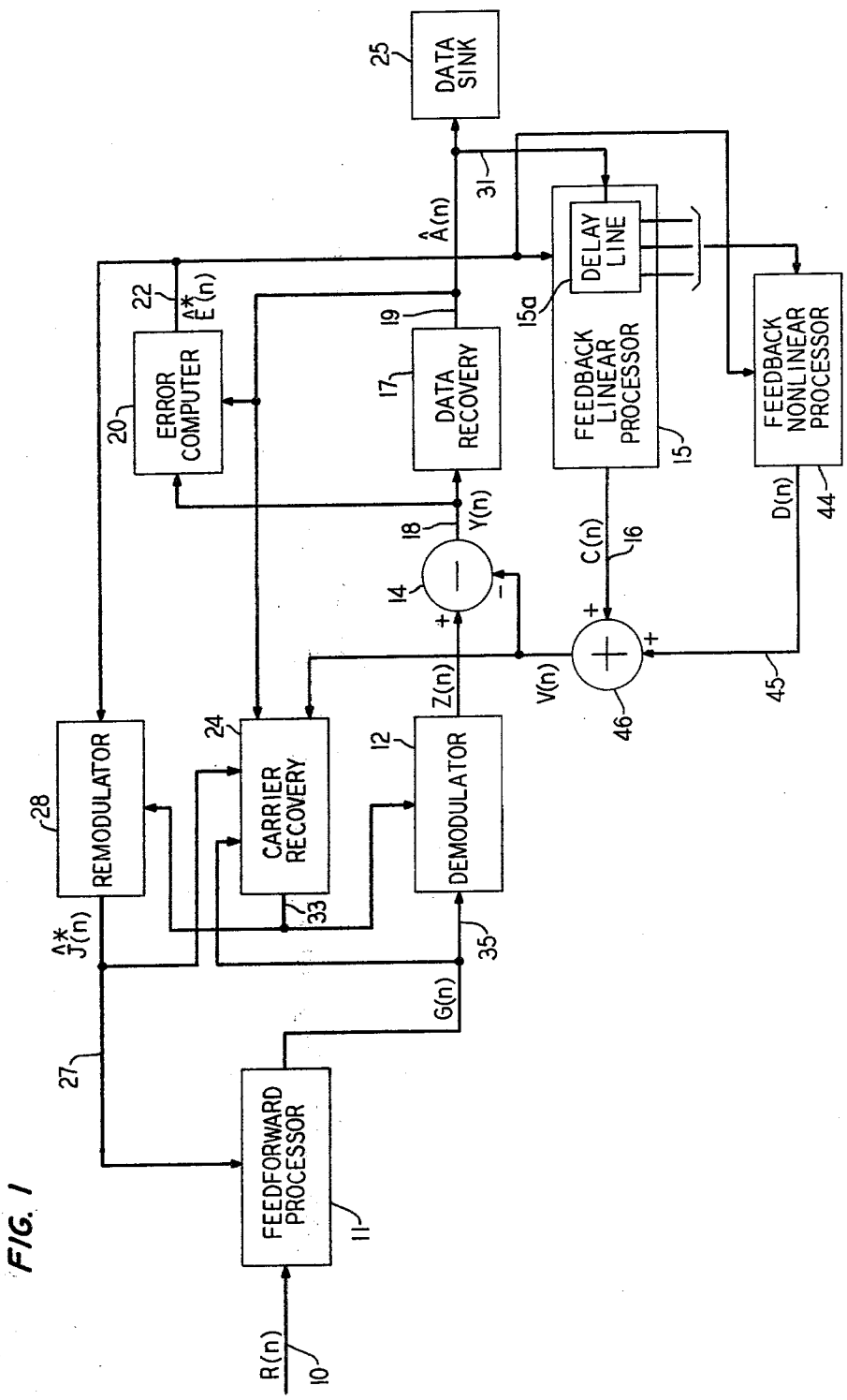
FIGS. 1 and 2 are block diagrams of first and second illustrative embodiments, respectively, of receivers for modulated data signals including equalization circuitry which combines with each sample a nonlinear feedback signal in accordance with the invention.

The receiver of FIG. 1 is illustratively employed in a high-speed telephone-voiceband data transmission system using quadrature amplitude modulation (QAM). The sampling interval is T seconds, the signaling rate being 1/T symbols per second. QAM entails both phase and amplitude modulation of a carrier, i.e., both the carrier phase and amplitude are information-bearing. As a result, QAM signals are referred to as "complex" signals and can be represented for notational convenience as complex numbers. This notational convention is followed herein so that all of the signal reference letters used in the following description should be understood to represent complex signals.

The receiver FIG. 1 is of the same general type as that disclosed in my U.S. Pat. No. 3,974,449 issued Aug. 10, 1976, which is hereby incorporated by reference. Thus, as in my earlier patent, a sample R(n) of a received QAM data signal is provided on input lead 10, the index n indicating that R(n) is the sample of the QAM signal at time nT. Sample R(n) is applied to a feedforward processor 11. After some delay, the latter generates an equalized version of sample R(n), feedforward signal G(n), on lead 35, thereby providing at least some compensation for intersymbol interference in sample R(n) as well as for some of the additive noise present therein. Feedforward processor 11 may include a feedforward linear processor of conventional design for generating as part of signal G(n) a linear combination of past, present and future received samples, providing compensation for linear intersymbol interference. If desired, feedforward processor 11 may also include a feedforward nonlinear processor of the type disclosed in my above-referenced copending U.S. patent application. Such a feedforward nonlinear processor generates as part of signal G(n) a linear combination of products of samples on lead 10 and their complex conjugates, thereby providing at least some compensation for nonlinear intersymbol interference.

Signal G(n) is extended to a demodulator 12 over lead 35. Demodulator 12 produces a demodulated baseband data signal Z(n) which is applied to one input of a subtractor 14.

The receiver of FIG. 1 further includes data recovery circuit, or quantizer, 17. This unit quantizes the output signal of subtractor 14—data recovery input signal Y(n)—to form a decision $\hat{A}(n)$ as to the value of the original modulating data symbol represented by, and to be recovered from, sample R(n). (Quantization of complex signals amounts to partitioning the complex plane into decision regions surrounding the ideal received points.) Decision $\hat{A}(n)$ passes on to data sink 25. Decision $\hat{A}(n)$ is also applied to feedback linear processor 15 over lead 31.

Feedback linear processor 15 operates in conventional fashion to generate a feedback linear signal C(n) on lead 16. Signal C(n) is comprised of a linear combination of decisions made by data recovery circuit 17 prior to decision $\hat{A}(n)$. Processor 15 includes a delay line 15a to facilitate the formation of signal C(n). Signal C(n) is combined with—illustratively subtracted from—signal Z(n) in a manner described below to form the above-mentioned signal Y(n), thereby removing at least a portion of the linear intersymbol interference and additive noise not compensated for upstream in feedforward processor 11.

In accordance with the present invention, a feedback nonlinear signal D(n) is provided on lead 45 by a feedback nonlinear processor 44. Signal D(n) is also subtracted from signal Z(n), thereby removing at least a portion of the nonlinear intersymbol interference and additive noise not compensated for upstream in processor 11. As described in detail below, signal D(n) is comprised of a weighted sum of products of decisions made by data recovery circuit 17 and the complex conjugates of such data decisions, each product, in turn, modulating a predetermined harmonic of the carrier frequency. Signals C(n) and D(n) are illustratively subtracted from signal Z(n) by first adding them together in an adder 46 generate a composite feedback signal V(n). The latter is then subtracted from a signal Z(n) in subtractor 14 to generate signal Y(n).

So-called weighting, or tap, coefficients for forming the aforementioned combinations of (a) received signal samples and products of signal samples and complex conjugates thereof in feedforward processor 11, (b) data decisions in feedback linear processor 15, and (c) products of data decisions and complex conjugates thereof in feedback nonlinear processor 44, are automatically adjusted in an adaptive, decision-directed manner. This automatic adjustment of tap coefficients is implemented by circuitry including error computer 20. This unit provides on lead 22 the complex conjugate, $\hat{E}^*(n)$, of an estimated error signal $\hat{E}(n)$, the latter representing the difference between signal Y(n) and decision $\hat{A}(n)$. The tap coefficients used in processors 15 and 44 are adjusted in response to signal $\hat{E}^*(n)$ in such a way as to minimize the average squared magnitude of that signal. The tap coefficients used in processor 11 are adjusted in response to the complex conjugate of a modulated version of the estimated error signal—signal $\hat{J}^*(n)$—again in such a way as to minimize the average squared magnitude of that signal. Signal $\hat{J}^*(n)$ is provided to processor 11 by remodulator 28 on lead 27.

Phase jitter and frequency offset in modulated data sample R(n) can hinder accurate data recovery. In order to compensate for these impairments, demodulator 12 and remodulator 28 perform their functions using complex exponential signals of the form $e^{-j[2\pi f_c nT + \hat{\theta}(n)]}$, which are generated by carrier recovery circuit 24. The phase angle $\hat{\theta}(n)$ is an estimate of the carrier phase $\theta(n)$ of sample R(n). The estimated phase $\hat{\theta}(n+1)$ during the $(n+1)^{st}$ sampling period is updated in accordance with $$\hat{\theta}(n+1) = \hat{\theta}(n) - \alpha(n) \text{Im}[\hat{J}^*(n)G(n)] \tag{1}$$

Carrier recovery circuit 24 receives signals $\hat{J}^*(n)$ and G(n) for purposes of computing $\hat{\theta}(n+1)$ in accordance with Eq. (1).

The factor $\alpha(n)$ in Eq. (1) may simply be a constant stored within the carrier recovery circuit 24. Alternatively, factor $\alpha(n)$ may be a function of current signal values so that updating of $\hat{\theta}(n)$ is carried out in response only to the phase angle error $[\theta(n) - \hat{\theta}(n)]$ and not in response to errors due to imperfect equalization and random amplitude modulation by data symbols in processors 11, 15 and 44. In deriving an expression for such an $\alpha(n)$, perfect equalization is postulated by assuming that the only discrepancy between Y(n) and A(n) is in the phase error, $[\theta(n) - \hat{\theta}(n)]$. Therefore, $$Z(n) \approx [\hat{A}(n) + V(n)] e^{j[\theta(n) - \hat{\theta}(n)]}. \tag{2}$$

Moreover, $E(n) = Z(n) - V(n) - \hat{A}(n)$ and it can be shown that $J^*(n)G(n)$ is mathematically equivalent to $E^*(n)Z(n)$. Therefore, Eq. (2) can be substituted into Eq. (1) to yield $$\hat{\theta}(n+1) = \hat{\theta}(n) - \alpha(n) |\hat{A}(n) + V(n)|^2 \sin(\hat{\theta}(n) - \theta(n)).$$

Therefore, a suitable choice for $\alpha(n)$ is seen to be $$\alpha(n) = \alpha / |A(n) + V(n)|^2, \tag{3}$$

where $\alpha$ is a small constant, because then $$\hat{\theta}(n+1) = \hat{\theta}(n) - \alpha \sin(\hat{\theta}(n) - \theta(n)).$$

Thus, as desired, the updating of $\hat{\theta}(n)$ is based only on the phase error, providing a smoother, more direct acquisition of carrier phase. Carrier recovery circuit 24 illustratively receives decision A(n) and signal V(n) for purposes of generating $\alpha(n)$ in accordance with Eq. (3).

Figure 2:
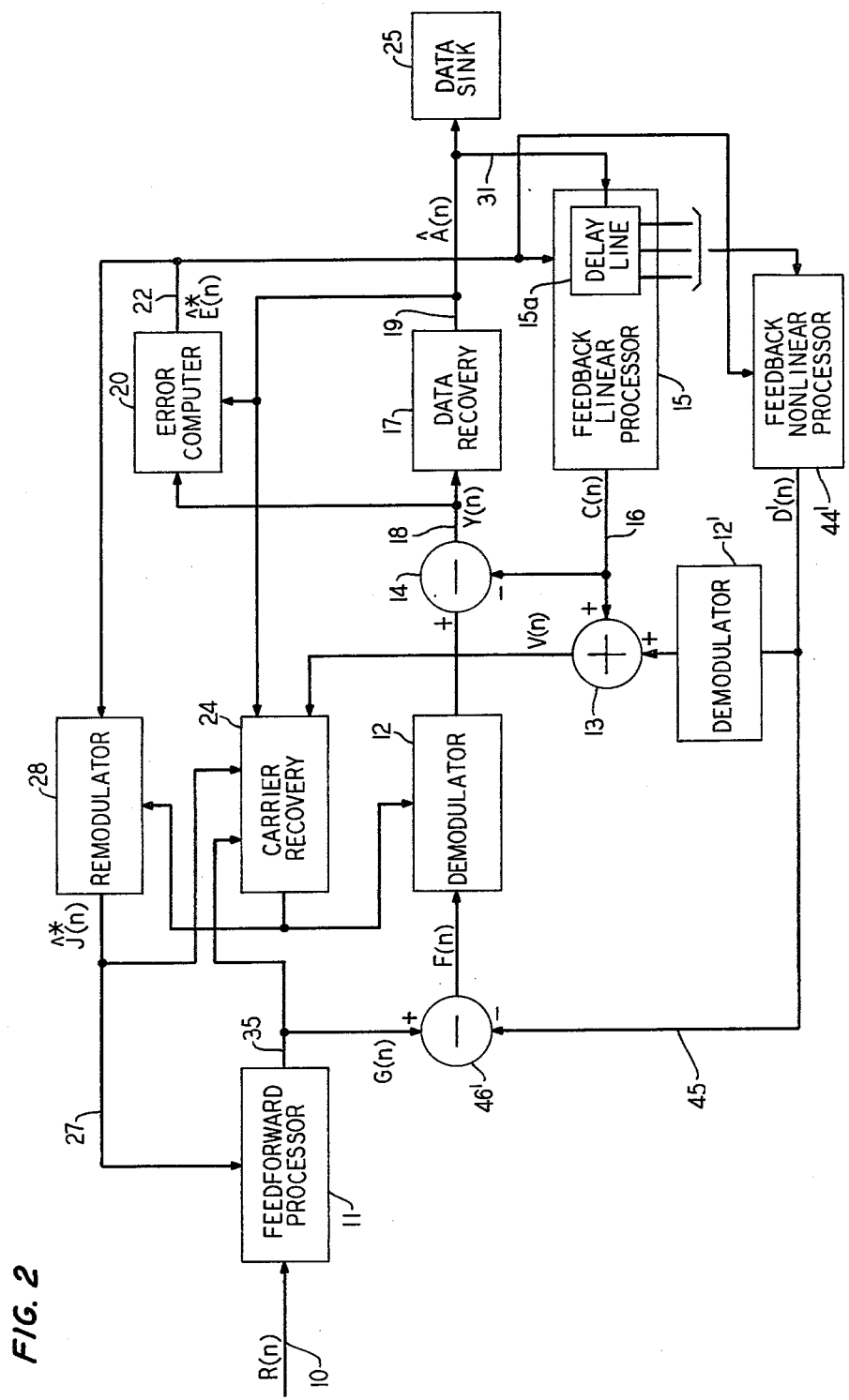

FIG. 2 illustrates an alternative embodiment of a receiver which includes a feedback nonlinear processor in accordance with the invention. Here, the output of the feedback nonlinear processor 44'—feedback nonlinear signal D'(n)—is subtracted from signal G(n) in a subtractor 46' to form a combined modulated signal F(n) rather than being subtracted from signal Z(n) via adder 46 as in FIG. 1. Signal D'(n) differs from signal D(n) in that different harmonics multiply each data decision/complex conjugate product, as described below. In addition, signal V(n) is generated for purposes of carrier recovery, as previously described, by passing signal D'(n) through a demodulator 12' and adding the output thereof to signal C(n) in an adder 13. The embodiments of FIGS. 1 and 2 are otherwise similar, however, with corresponding elements having the same reference numeral in each FIG. Thus the preceding discussion relating to the structure and operation of the receiver of FIG. 1 is generally applicable to the receiver of FIG. 2.

With the exception of processor 44 (FIG. 1), processor 44' (FIG. 2), and the feedforward nonlinear circuitry in processor 11, if any, the specific circuitry comprising the various components of the receivers of FIGS. 1 and 2, as well as their functional and timing interrelationships, are all well known in the art and need not be discussed in further detail. See, for example, my above-cited U.S. Patent for a description of the receiver generally and my above-cited copending U.S. Patent application for a description of the feedforward nonlinear circuitry. The remainder of this detailed description, then, is principally directed to (a) characterization of feedback nonlinear signals D(n) and D'(n) and (b) description of illustrative circuitry, shown in FIGS. 3 and 4, for generating them.

In accordance with the present invention, the feedback nonlinear signal associated and combined with each sample of the received signal includes a weighted sum of products of individual ones of the data decisions made by data recovery circuit 17 and complex conjugates of such data decisions. Each data decision/complex conjugate product—hereinafter referred to for generality as "decision/conjugate product" even though a particular product may not have any complex conjugates—in turn, modulates a predetermined harmonic of the carrier frequency, thereby providing a plurality of modulated weighted products. Each decision/conjugate product has a predetermined number of multiplicands, each of which bears a predetermined temporal relationship to the associated sample. In general, inclusion in the feedback nonlinear signal of products having a total of m data decisions and complex conjugates provides compensation for $m^{th}$ order intersymbol interference.

In the case where the feedback nonlinear signal is added to the associated sample after demodulation, as in FIG. 1, the above-mentioned harmonic is of the general form $$e^{j[2\pi f_c nT(x-y-1)+\Phi_{x,y}]}, \qquad (4a)$$

where
- $f_c$ = carrier frequency
- n = sample time index
- x = number of data decisions in the decision/conjugate product which the harmonic multiplies
- y = number of complex conjugates in the decision/conjugate product which the harmonic multiplies
- $\Phi_{x,y}$ = a selected phase angle (discussed below).

In the case where the feedback nonlinear signal is added to the associated sample prior to demodulation, as in FIG. 2, the harmonic is of the general form $$e^{j[2\pi f_c nT(x-y)+\Phi_{x,y}]}. \qquad (4b)$$

The phase angle $\Phi_{x,y}$ in Eqs. 4(a) and 4(b) may be, for example, a term which corrects for distortion due to phase jitter and/or frequency offset in the nonlinear terms of each received sample, i.e., the products of modulated data symbols which constitute the nonlinear intersymbol interference to be removed from the sample. If at least some of this distortion was introduced in the transmission system prior to the nonlinearity which caused the nonlinear intersymbol interference, different values of $\Phi_{x,y}$ may have to be selected for each combination of values of the parameters x and y.

In the embodiments disclosed herein, however, it is presumed that any phase jitter or frequency offset was introduced after the nonlinearity. As a result, all the $\Phi_{x,y}$'s may have the same value. In particular, any phase jitter and/or frequency offset in the nonlinear terms is compensated for in the embodiment of FIG. 1 by virtue of the fact that those terms are removed from each sample after a demodulation which multiplies the sample by $e^{-j[2\pi f_c nT+\theta(n)]}$. Thus each $\Phi_{x,y}$ can be set to an arbitrary constant, illustratively zero. In the embodiment of FIG. 2, on the other hand, the nonlinear terms are removed from the sample being processed prior to demodulation. In order to compensate in this embodiment for phase jitter and/or frequency offset in the nonlinear terms, each $\Phi_{x,y}$ is illustratively set to $\theta(n)$.

Attention is now particularly directed to the embodiment of FIG. 1. Processor 44 thereof illustratively provides compensation for second- and third-order nonlinear intersymbol interference. Thus, composite feedback signal V(n) can be expressed as follows:

$$V(n) = [C(n) + D(n)] \qquad (5)$$

where $$C(n) = \sum_i B_i^{(0)*}(n)\hat{A}(n-i)$$

and $D(n) =$ $$\left[\sum_{(j_1,j_2)} B^{(1)*}_{j_1,j_2}(n)\, \hat{A}(n-j_1)\hat{A}(n-j_2)\right] e^{j[2\pi f_c nT + \Phi_{2,0}]} \equiv D_1(n)$$

$$+ \left[\sum_{(j_3,j_4)} B^{(2)*}_{j_3,j_4}(n)\, \hat{A}(n-j_3)\hat{A}(n-j_4)^*\right] e^{-j[2\pi f_c nT - \Phi_{1,1}]} \equiv D_2(n)$$

$$+ \left[\sum_{(k_1,k_2,k_3)} B^{(3)*}_{k_1,k_2,k_3}(n)\, \hat{A}(n-k_1)\hat{A}(n-k_2)\hat{A}(n-k_3)\right] e^{j[4\pi f_c nT + \Phi_{3,0}]} \equiv D_3(n)$$

-continued $$+ \left[ \sum_{(k_4,k_5,k_6)} B_{k_4,k_5,k_6}^{(4)*}(n) \hat{A}(n - k_4)\hat{A}(n - k_5)\hat{A}(n - k_6)^* \right] e^{j\Phi_{2,1}} \equiv D_4(n)$$

$$+ \left[ \sum_{(k_7,k_8,k_9)} B_{k_7,k_8,k_9}^{(5)*}(n) \hat{A}(n - k_7)^*\hat{A}(n - k_8)^*\hat{A}(n - k_9) \right] e^{-j[4\pi f_c nT - \Phi_{1,2}]} \equiv D_5(n)$$

C(n), the prior art feedback linear signal, is comprised of a linear combination of data decisions $\hat{A}(n-i)$, each sample being weighted by the complex conjugate of complex weighting, or tap, coefficient $$B_i^{(0)}(n), \text{ i.e., } B_i^{(0)*}(n).$$

The index i typically spans a range of positive values $\geq 1$ so that C(n) includes a sufficient number of data decisions made in data recovery circuit 17 prior to decision A(n) to yield effective equalization. As is conventional, the values of coefficients $$B_i^{(0)}(n)$$

are adjusted adaptively in a decision-directed manner in processor 15 illustratively using a gradient adaptation algorithm, yielding the updating relationship $$B_i^{(0)}(n + 1) = B_i^{(0)}(n) + \gamma_0(n)\hat{A}(n - i)\hat{E}^*(n),$$

with $\gamma_0(n)$ having a selected scaling factor which may be updated each sampling period or which may more simply be a constant.

The first two terms of feedback nonlinear signal D(n), defined for convenience as $D_1(n)$ and $D_2(n)$, provide compensation for second-order intersymbol interference. (In a given application, it may be desired to include only one of these terms in signal D(n).) Each of the terms $D_1(n)$ and $D_2(n)$ is comprised of a weighted sum of two-multiplicand products which are modulated, in turn, by a harmonic of the carrier frequency defined by Eq. 4a. Each multiplicand of each product is derived from a selected data decision. That is, each multiplicand is either a data decision or the complex conjugate of a data decision.

In particular, the two multiplicands of each decision/conjugate product of term $D_1(n)$ are a selected two data decisions $\hat{A}(n-j_1)$ and $\hat{A}(n-j_2)$ weighted by the complex conjugate of an associated weighting coefficient $$B_{j_1,j_2}^{(1)}(n), \text{ i.e., } B_{j_1,j_2}^{(1)*}(n),$$

and modulated by $e^{j2\pi f_c nT}$ (all the $\Phi_{x,y}$'s being zero in this embodiment, as discussed above). Index pairs $(j_1,j_2)$ are predetermined and are selected keeping in mind that the nonlinear (and, indeed, linear) intersymbol interference in a data decision can usually be most effectively dealt with by generating the feedback signal in response to data decisions which are relatively close in the output data decision stream to the data decision currently being made. Moreover, increasing the number of index pairs to encompass data decisions which are more remote in time will have increasingly less effect in removing intersymbol interference, on the one hand, while possibly requiring increased hardware costs and/or processing time on the other hand. In the present embodiment, the following $(j_1,j_2)$ index pairs are illustratively used: (1,1)(1,2)(1,3)(2,2)(2,3)(3,3). The modulated weighted products of term $D_1(n)$ are thus given by $$\left[ B_{1,1}^{(1)*} \hat{A}(n-1)^2 + B_{1,2}^{(1)*} \hat{A}(n-1)\hat{A}(n-2) \right.$$

$$+ B_{1,3}^{(1)*} \hat{A}(n-1)\hat{A}(n-3) + B_{2,2}^{(1)*} \hat{A}(n-2)^2$$

$$\left. + B_{2,3}^{(1)*} \hat{A}(n-2)\hat{A}(n-3) + B_{3,3}^{(1)*} \hat{A}(n-3)^2 \right] e^{j2\pi f_c nT}.$$

This term, then, encompasses a modulated weighted sum of all possible two-multiplicand products in which each multiplicand is one of the three previous data decisions.

The second term of signal D(n), $D_2(n)$, is similar to $D_1(n)$ except that the second multiplicand of each product is a complex conjugate and except that, per Eq. 4(a), the modulated harmonic is different. An illustrative set of index pairs $(j_3,j_4)$ for this second terms is (1,1)(1,2)(1,3)(2,1)(2,2)(2,3)(3,1)(3,2)(3,3). Note that reversing the order of the $(j_3,j_4)$ index pairs, e.g., (1,2) and (2,1), provides different products in term $D_2(n)$, although not in term $D_1(n)$. Thus, even though all of the indices $j_3$ and $j_4$ are each either 1, 2 or 3, just as in the case of indices $j_1$ and $j_2$, here there are nine possible different decision/conjugate products, rather than six as in the case of term $D_1(n)$.

The final three terms of signal D(n), $D_3(n)$, $D_4(n)$ and $D_5(n)$, provide compensation for third-order intersymbol interference. (Again, in a given application, it may be desired to use less than all of these terms.) In particular, term $D_3(n)$ is comprised of a weighted sum of three-multiplicand products each having an associated weighting coefficient and each modulating the appropriate harmonic from Eq. 4(a). Terms $D_4(n)$ and $D_5(n)$ are similar to term $D_3(n)$ but include one and two complex conjugates of data decisions, respectively. Index triples $(k_1,k_2,k_3)$ for term $D_3(n)$ illustratively take on the values
(1,1,1)(1,1,2)(1,2,2)(1,2,3)(2,2,2)(2,2,3)(3,2,3)(3,3,3).
Index triples for terms $D_4(n)$ and $D_5(n)$ illustratively take on the values (1,1,1)(1,1,2)(1,2,1)(1,2,3)(1,3,2)(2,1,2)(2,2,1)(2,2,2)(2,2,-3)(2,3,1)(2,3,2)(3,2,3)(3,3,2)(3,3,3) in each case. Note that for index triples $(k_1,k_2,k_3)$, $(k_4,k_5,k_6)$ and $(k_7,k_8,k_9)$ less than all possible combinations yielding unique three-multiplicand decision/conjugate products are used. This is done simply to minimize the amount of signal processing needed to generate signal D(n). In general, using all possible combinations yielding unique three-multiplicand decision/conjugate products in generating terms $D_3(n)$, $D_4(n)$ and $D_5(n)$ will provide additional reduction of third-order intersymbol interference.

Compensation for fourth- or higher-order intersymbol interference may be provided in accordance with the invention by obvious extension of the second- and third-order cases.

As previously indicated, the values of the weighting coefficients used in feedback nonlinear processor 44, like those used in feedback linear processor 15, are adjusted adaptively in a decision-directed manner. As in the case of processor 15, a gradient adaptation criterion is illustratively used. By way of example, this criterion is expressed for the coefficients $\overset{(1)}{B}(n)$ as:
$_{j_1,j_2}$ $$\overset{(1)}{B}_{j_1,j_2}(n+1) = \overset{(1)}{B}_{j_1,j_2}(n) - 1/2 \left[ \gamma_1(n) \frac{\delta|\hat{E}(n)|^2}{\delta \overset{(1)}{B}_{j_1,j_2}(n)} \right]$$

where, $$\frac{\delta|\hat{E}(n)|^2}{\delta \overset{(1)}{B}(n)} = \frac{\delta|\hat{E}(n)|^2}{\delta RE\left(\overset{(1)}{B}_{j_1,j_2}(n)\right)} + j \frac{\delta|\hat{E}(n)|^2}{\delta Im\left(\overset{(1)}{B}_{j_1,j_2}(n)\right)}$$

$$= -2\hat{A}(n-j_1)\hat{A}(n-j_2)\hat{E}^*(n)e^{j[2\pi f_c nT + \Phi_{2,0}]}.$$

Thus, $$\overset{(1)}{B}_{j_1,j_2}(n+1) =$$

$$\overset{(1)}{B}_{j_1,j_2}(n) + \gamma_1(n)\hat{A}(n-j_1)\hat{A}(n-j_2)\hat{E}^*(n)e^{j[2\pi f_c nT + \Phi_{2,0}]}. \tag{6}$$

The other four sets of weighting coefficients used in generating term $D(n)$ are generated similarly to coefficients $\overset{(1)}{B}(n).$
$_{j_1,j_2}$ That is, $$\overset{(2)}{B}_{j_3,j_4}(n+1) =$$

$$\overset{(2)}{B}_{j_3,j_4}(n) + \gamma_2(n)\hat{A}(n-j_3)\hat{A}(n-j_4)^*\hat{E}^*(n)e^{-j[2\pi f_c nT - \Phi_{1,1}]},$$

$$\overset{(3)}{B}_{k_1,k_2,k_3}(n+1) =$$

$$\overset{(3)}{B}_{k_1,k_2,k_3}(n) + \gamma_3(n)\hat{A}(n-k_1)\hat{A}(n-k_2)\hat{A}(n-k_3)\hat{E}^*(n)e^{j[4\pi f_c nT + \Phi_{3,0}]},$$

$$\overset{(4)}{B}_{k_4,k_5,k_6}(n+1) =$$

$$\overset{(4)}{B}_{k_4,k_5,k_6}(n) + \gamma_4(n)\hat{A}(n-k_4)\hat{A}(n-k_5)\hat{A}(n-k_6)^*\hat{E}^*(n)e^{j\Phi_{2,1}}, \text{ and}$$

$$\overset{(5)}{B}_{k_7,k_8,k_9}(n+1) =$$

$$\overset{(5)}{B}_{k_7,k_8,k_9}(n) + \gamma_5(n)\hat{A}(n-k_7)^*\hat{A}(n-k_8)^*\hat{A}(n-k_9)\hat{E}^*(n)e^{-j[4\pi f_c nT - \Phi_{1,2}]}.$$

Although, in general, multiplicative scaling factors $\gamma_1(n) - \gamma_5(n)$ can be updated at each sampling time, they, like $\gamma_0(n)$, can more simply be fractional constants, the values of which are determined empirically. As seen in FIG. 1, feedback nonlinear processor 44, like feedback linear processor 15, receives signal $\hat{E}(n)$ for purposes of coefficient updating.

Feedback nonlinear signal $D'(n)$ of FIG. 2 is similar to signal $D(n)$ except that the multiplicative harmonics are given by Eq. 4(b). (The same index pairs and triples can be used, however.) Thus, $D'(n) =$ $$\left[ \sum_{(j_1,j_2)} \overset{(1)*}{B}_{j_1,j_2}(n) \hat{A}(n-j_1)\hat{A}(n-j_2) \right] e^{j[4\pi f_c nT + \Phi_{2,0}]}$$

$$+ \left[ \sum_{(j_3,j_4)} \overset{(2)*}{B}_{j_3,j_4}(n) \hat{A}(n-j_3)\hat{A}(n-j_4)^* \right] e^{j\Phi_{1,1}}$$

$$+ \left[ \sum_{(k_1,k_2,k_3)} \overset{(3)*}{B}_{k_1,k_2,k_3}(n) \hat{A}(n-k_1)\hat{A}(n-k_2)\hat{A}(n-k_3) \right] e^{j[6\pi f_c nT + \Phi_{3,0}]}$$

$$+ \left[ \sum_{(k_4,k_5,k_6)} \overset{(4)*}{B}_{k_4,k_5,k_6}(n) \hat{A}(n-k_4)\hat{A}(n-k_5)\hat{A}(n-k_6)^* \right] e^{j[2\pi f_c nT + \Phi_{2,1}]}$$

$$+ \left[ \sum_{(k_7,k_8,k_9)} \overset{(5)*}{B}_{k_7,k_8,k_9}(n) \hat{A}(n-k_7)^*\hat{A}(n-k_8)^*\hat{A}(n-k_9) \right] e^{-j[2\pi f_c nT - \Phi_{1,2}]}$$

In addition, the coefficient updating relations for the FIG. 2 embodiment are given by $$B^{(1)}_{j_1,j_2}(n + 1) =$$
$$B^{(1)}_{j_1,j_2}(n) + \gamma_1(n)\hat{A}(n - j_1)\hat{A}(n - j_2)\hat{E}^*(n)e^{j[4\pi f_c nT + \Phi_{2,0}]},$$

$$B^{(2)}_{j_3,j_4}(n + 1) =$$
$$B^{(2)}_{j_3,j_4}(n) + \gamma_2(n)\hat{A}(n - j_3)\hat{A}(n - j_4)^*\hat{E}^*(n)e^{j\Phi_{1,1}},$$

$$B^{(3)}_{k_1,k_2,k_3}(n + 1) =$$
$$B^{(3)}_{k_1,k_2,k_3}(n) + \gamma_3(n)\hat{A}(n - k_1)\hat{A}(n - k_2)\hat{A}(n - k_3)\hat{E}^*(n)e^{j[6\pi f_c nT + \Phi_{3,0}]},$$

$$B^{(4)}_{k_4,k_5,k_6}(n + 1) =$$
$$B^{(4)}_{k_4,k_5,k_6}(n) + \gamma_4(n)\hat{A}(n - k_4)\hat{A}(n - k_5)\hat{A}(n - k_6)^*\hat{E}^*(n)e^{j[2\pi f_c nT + \Phi_{2,1}]},$$

and $$B^{(5)}_{k_7,k_8,k_9}(n + 1) =$$
$$B^{(5)}_{k_7,k_8,k_9}(n) + \gamma_5(n)\hat{A}(n - k_7)^*\hat{A}(n - k_8)^*\hat{A}(n - k_9)\hat{E}^*(n)e^{-j[2\pi f_c nT - \Phi_{1,2}]}.$$

As previously discussed, all the $\Phi_{x,y}$'s illustratively have the value $\hat{\theta}(n)$ in this embodiment which parameter could be provided, for example, from carrier recovery circuit 24.

Figure 3:
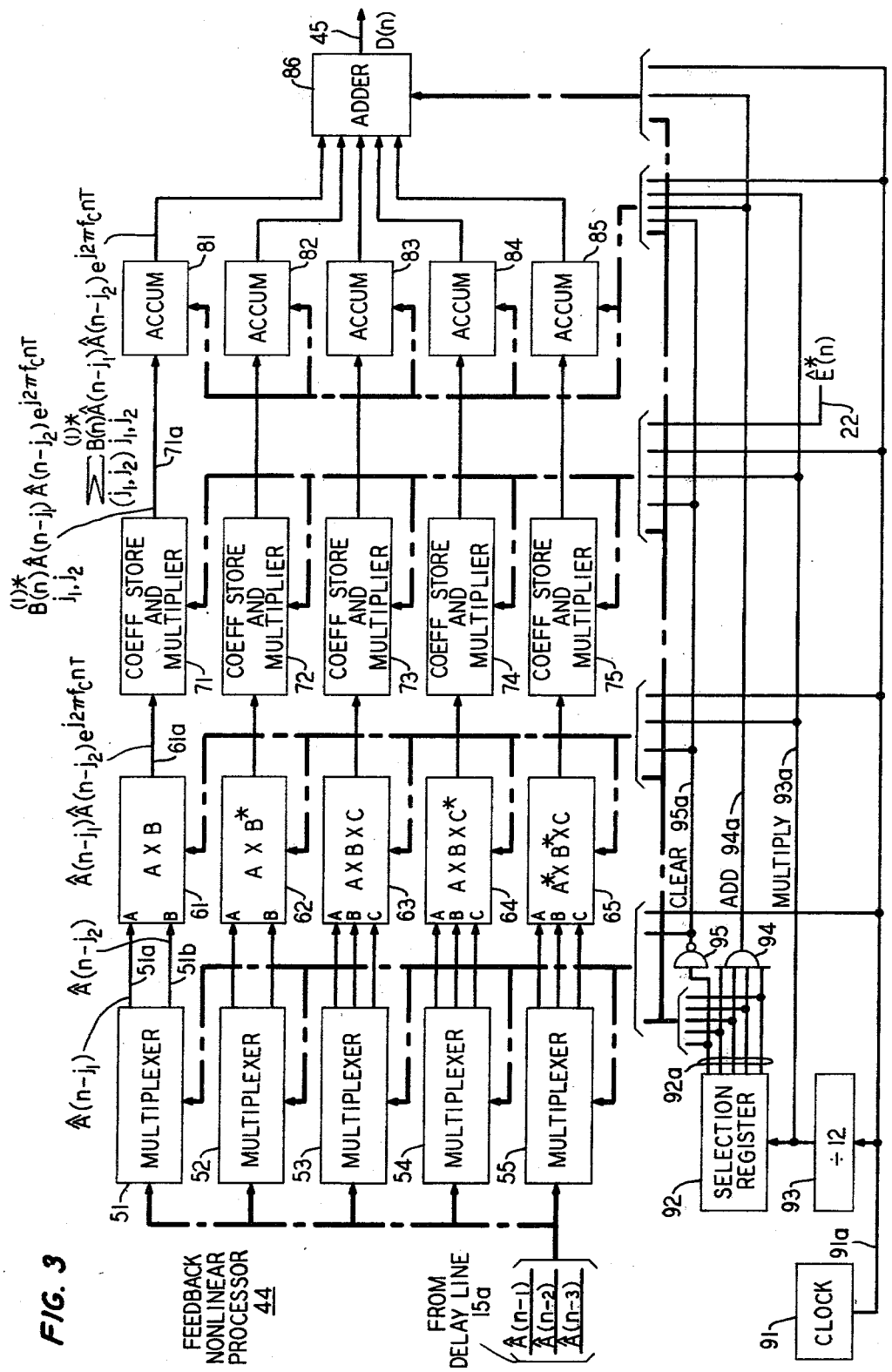
FIG. 3 is a block diagram of an illustrative feedback nonlinear signal processor for use in the receivers of FIGS. 1 and 2.

Attention is now directed to FIG. 3, which shows an illustrative embodiment of feedback nonlinear processor 44. Feedback nonlinear processor 44′ of FIG. 2 may be substantially the same except that, again, the harmonics which the decision/conjugate products modulate (in CSM units 71-75) are given by Eq. 4(b) rather than Eq. 4(a).

Processor 44 includes multiplexers 51-55, complex multipliers 61-65, coefficient store and multiplier (CSM) units 71-75 and accumulators 81-85. During each sampling period, the serially connected chain of multiplexer 51, multiplier 61 and CSM unit 71 generates and stores the six modulated weighted products of term $D_1(n)$ of signal $D(n)$ in accumulator 81. The modulated weighted products of terms $D_2(n)$–$D_5(n)$ are generated and stored similarly, each by its own multiplexer-multiplier-CSM unit-accumulator chain. Since the chains which begin with multiplexers 51 and 52 generate terms of signal $D(n)$ which have two-multiplicand decision/conjugate products, i.e., terms $D_1(n)$ and $D_2(n)$, those multiplexers each extend two output leads to two-input complex multipliers 61 and 62, respectively. Multiplexers 53-55 each extend three output leads to multipliers 63-65, respectively, in order to generate the three-multiplicand decision/conjugate products which make up terms $D_3(n)$–$D_5(n)$.

After terms $D_1(n)$–$D_5(n)$ have all been stored in their respective accumulators, they are added together in adder 86 to generate feedback nonlinear signal $D(n)$ on lead 45.

Processor 44 operates under the control of a clock 91. The latter, in turn, operates at a frequency sufficient to ensure that the generation of signal $D(n)$ is completed during a single sampling interval, T. As described in further detail below, the clock pulses on output lead 91a of clock 91 control the shifting through processor 44 of serial bit streams representing data decisions, complex conjugates of data decisions and intermediate products of these with each other and harmonics of the carrier frequency. The clock pulses on lead 91a are, in addition, received by a divide-by-twelve counter 93. The output pulses from counter 93 on lead 93a initiate multiplication operations in multipliers 61-65 and CSM units 71-75.

Counter 93 also drives selection register 92—illustratively a divide-by-seventeen counter. Register 92 increments the five-bit number represented by the signals on its five output leads 92a by one count in response to each pulse from counter 93 on lead 93a. During each sampling period, three previous data decisions—$\hat{A}(n-1)$, $\hat{A}(n-2)$ and $\hat{A}(n-3)$—are received by multiplexers 51-55 from delay line 15a of feedback linear processor 15, the two feedback processors advantageously sharing this delay line between them. Each of the three decisions is illustratively represented by twelve serial bits which are stored internally by each multiplexer in response to the first twelve clock pulses on lead 91a. The count on leads 92a at any given time indicates to each of the multiplexers which of the three decisions is to be provided on each of the multiplexer output leads in response to each group of twelve clock pulses.

By way of illustration, operation of the chain which begins with multiplexer 51 in generating term $D_1(n)$ will now be described, the operation of the other chains being similar. For purposes of explanation, it is assumed that the first sixty clock pulses within the $n^{th}$ sampling period have elapsed. Thus, at this point, the first three modulated weighted products of term $D_1(n)$ have been summed and stored in accumulator 81. The fourth modulated weighted product, $$\overset{(1)*}{\underset{2,2}{B(n)}}\hat{A}(n-2)^2,$$

has just been generated in CSM unit 71, while the fifth, unweighted modulated product, $\hat{A}(n-2)\hat{A}(n-3)e^{j2\pi f_c nT}$ has just been generated in multiplier 61.

A number of operations occur concurrently in response to the next twelve clock pulses. The twelve bits representing $$\overset{(1)*}{\underset{2,2}{B(n)}}\hat{A}(n-2)^2 e^{j2\pi f_c nT}$$

are shifted via lead 71a from CSM unit 71 into accumulator 81, where it is added to the current contents of the accumulator. In addition, the unweighted, fifth product $\hat{A}(n-2)\hat{A}(n-3)e^{j2\pi f_c nT}$ is shifted via lead 61a from multiplier 61 into CSM unit 71. The binary count on leads 92a is now 00101. In response to that count and to the twelve clock pulses currently being generated, multiplexer 51 provides the decision $\hat{A}(n-3)$ on both of its output leads 51a and 51b since the sixth (and last) value of index pair (j₁,j₂) is (3,3). The subsequent pulse on lead 93a initiates the accumulation operation in accumulator 81. It also initiates the multiplication in CSM unit 71 of $\hat{A}(n-2)\hat{A}(n-3)$ with the complex conjugate of the current value of its associated weighting coefficient, $$\overset{(1)*}{\underset{2,3}{B(n)}}$$

stored in the CSM unit. The pulse on lead 93a also initiates the multiplication in multiplier 61 of decision $\hat{A}(n-3)$ by itself and by the harmonic $e^{j2\pi f_c nT}$. The latter may be provided in any of several ways, such as from the oscillator section of carrier recovery circuit 24. (For drawing clarity, a specific lead connection from the latter is not shown in the drawing.)

The count on leads 92a, in addition to the function described above, is also used to indicate to the various components of feedback nonlinear processor 44 when and when not to respond to the clock pulses on lead 91a. For example, the fact that the last, i.e., sixth, two-multiplicand decision/conjugate product in term D₁(n) has now been generated is manifested by the fact that the count on leads 92a is 00101. Simple logic circuitry within multiplexer 51 and multiplier 61 precludes them from responding to further clock pulses. CSM unit 71 begins and ceases operation twelve clock pulses after multiplexer 51 and multiplier 61 begin and cease their operation; for accumulator 81 the number is twenty-four clock pulses. Thus, similar logic circuitry in CSM units 71 and accumulator 81 allows them to respond to clock pulses only when the count on leads 92a is at or between 00001 and 00110, for the former, and 00010 and 00111 for the latter. The other components within each chain of processor 44 similarly have logic circuits for controlling which clock pulses they will respond to, depending on (a) how many products are to be computed in that chain and (b) the position of the particular component within its chain. A typical such logic circuit is shown in the illustrative embodiment of CSM unit 71 in FIG. 4, as described below.

When the count on leads 92a has reached 01111, terms D₁(n)–D₅(n) have all been generated and stored in accumulators 81–85, respectively. AND gate 94 now generates a pulse on lead 94a which causes the contents of accumulators 81–85 to be added together in adder 86, the resultant signal on lead 45 being feedback nonlinear signal D(n). When the count on leads 92a reaches its last value, 10000, the output of NOT gate 95 on lead 95a goes low, clearing multiplexers 51–55, multipliers 61–65, CSM units 71–75, and accumulators 81–85 in preparation for generating feedback nonlinear signal D(n+1) during the next, (n−1)ˢᵗ, sampling period.

It will be appreciated that FIG. 3 represents but one of numerous possible approaches for realizing feedback nonlinear processor 44 (or, as previously indicated, processor 44'). Thus, for example, the terms D₁(n)–D₅(n) could be generated serially, one after the other, rather than in parallel. Such an approach would require less arithmetic hardware. However, the circuitry needed to manipulate the decisions and complex conjugate and their products would be more complicated. In addition, all of the arithmetic operations which have to be performed in generating signal D(n) would still have to be completed during a single sampling period, imposing more stringent requirements on the speed with which the various arithmetic operations would have to be performed. These requirements might be advantageously satisfied by generating signal D(n) using a microprocessor. In any event, it will be appreciated that the needs of the particular application will govern the structure of processor 44.

Figure 4:
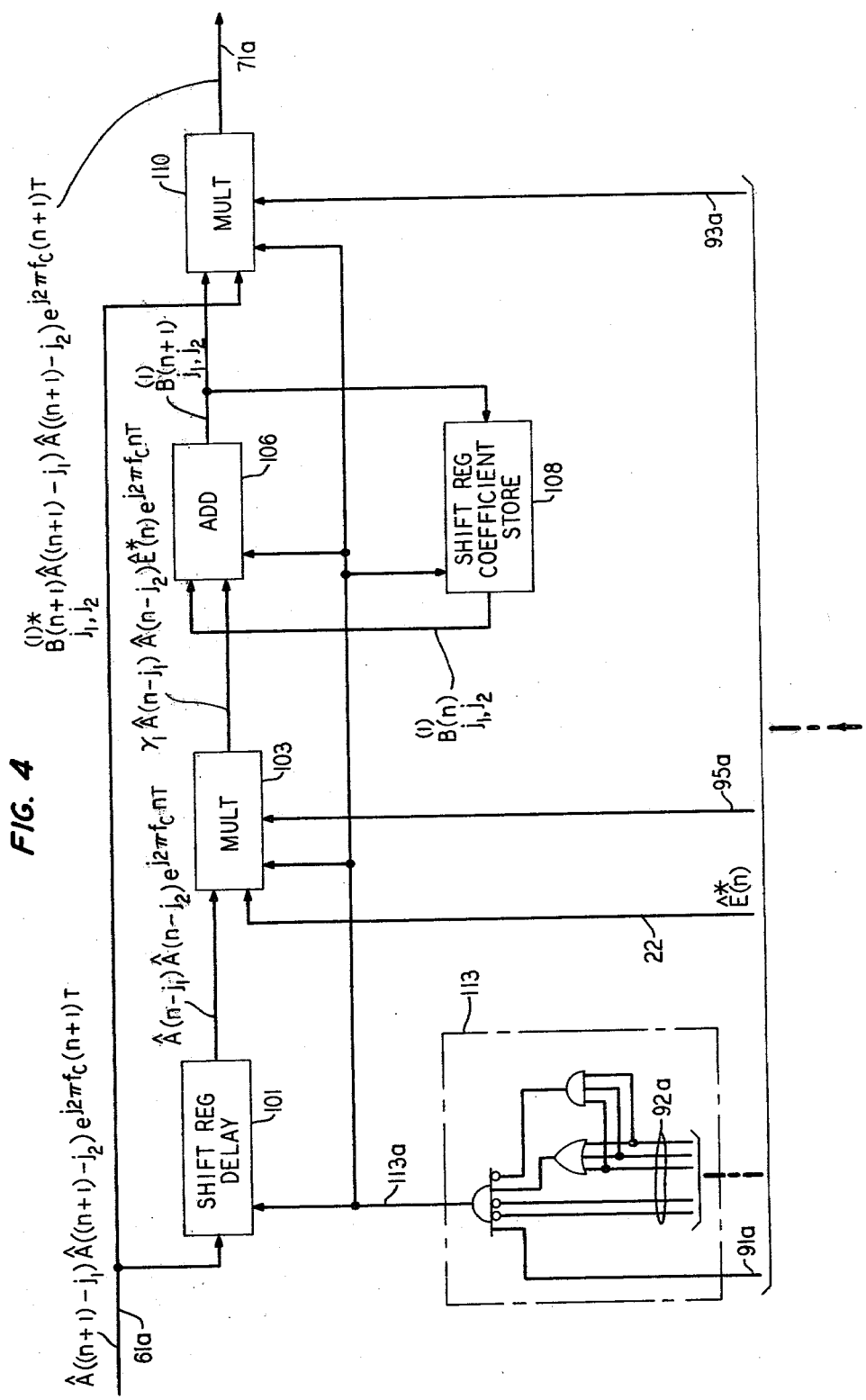
FIG. 4 is an illustrative coefficient store and multiplier unit for use in the processor of FIG. 3.

Each of the functional blocks depicted in FIG. 3 may be of conventional design and need not be described in further detail herein. However, a particularly advantageous realization for CSM unit 71 (CSM units 72–75 being similar) is shown in FIG. 4.

Each component of CSM unit 71 receives clock pulses via lead 113a. As previously indicated, CSM unit 71 is to operate only when the count on leads 92a is at or between 0001 and 0110. This mode of operation is achieved by logic circuit 113 which controls the flow of clock pulses onto lead 113a from lead 91a in response to the count on leads 92a.

It will be remembered from Eq. (6) that the updated value of each coefficient is given by its previous value plus a term which includes signal $\tilde{E}(n)$. The latter, however, is not known until signal D(n) has been generated. Thus, as shown in FIG. 4, the modulated products $\hat{A}(n-j_1)\hat{A}(n-j_2)e^{j2\pi f_c nT}$ received by CSM unit 71 are delayed in a serial in/serial out shift register 101 such that as the first modulated product of term D₁(n), $\hat{A}(n-1)^2 e^{j2\pi f_c nT}$, emerges from shift register 101 at the beginning of the next, (n+1)ˢᵗ, sampling period, signal $\tilde{E}(n)$ is first becoming available on lead 22. $\hat{A}(n-1)^2 e^{j2\pi f_c nT}$ is multiplied in multiplier 103 by signal $\tilde{E}(n)$ and by γ₁(n)—illustratively a constant, γ₁—to generate the correction term $\gamma_1 \hat{A}(n-1)^2 \tilde{E}(n) e^{j2\pi f_c nT}$.

At this time, coefficient $$\overset{(1)}{\underset{1,1}{B(n)}}$$

is just beginning to appear at the output of coefficient store 108, illustratively another serial in/serial out shift register. The correction term at the output of multiplier 103 is added to $$\overset{(1)}{\underset{1,1}{B(n)}}$$

in adder 106 to generate $$B_{1,1}^{(1)}(n+1).$$

Since at this time the first decision/conjugate product of term $D_1(n+1)$—$\hat{A}((n+1)-1)^2$—is being introduced on lead 61a, coefficient $$B_{1,1}^{(1)}(n+1)$$

is passed directly to multiplier 110, so that the latter is able to form on lead 71a the product $$B_{1,1}^{(1)*}(n+1)\hat{A}((n+1)-1)^2 e^{j2\pi f_c(n+1)T},$$

i.e., the first weighted modulated product of term $D_1(n+1)$. In addition, coefficient $$B_{1,1}^{(1)}(n+1)$$

is entered into coefficient store 108 from which it will emerge for updating at the beginning of the $(n+2)^{nd}$ sampling period to generate $$B_{1,1}^{(1)}(n+2).$$

Similarly, as each subsequent decision/conjugate product making up term $D_1(n+1)$ is introduced on lead 61a, the corresponding coefficient emerges from coefficient store 108, is updated, and is multiplied by that product and the harmonic $e^{j2\pi f_c nT}$ in multiplier 110. At the end of the $(n+1)^{st}$ sampling period, the pulse on lead 95a clears signal $\hat{E}(n)$ stored in multiplier 103 in preparation for storage therein of signal $\hat{E}(n+1)$.

Althouh specific embodiments of my invention have been shown and described, such merely illustrate the principles of my invention. For example, although the invention has been illustrated in conjunction with a QAM system, it is equally applicable to any modulated system in which both the carrier phase and amplitude are modulated, i.e., information-bearing.

Thus, it will be appreciated that numerous arrangements embodying the principles of the invention may be devised by those skilled in the art without departing from their spirit and scope.

I claim:

1. An arrangement for equalizing samples of a received modulated data signal having a predetermined carrier frequency, said arrangement including means operative in response to said samples for forming decisions as to the values of data symbols represented thereby, each of said decisions being represented by a complex number, characterized in that said arrangement further includes means (51–55, 61–65) for forming a plurality of signal products associated with an individual one of said samples, each multiplicand of each product being derived from a respective one of said decisions, each said respective one of said decisions bearing a predetermined temporal relationship to said one of said samples, at least one multiplicand of individual ones of said signal products being the complex conjugate of the decision from which said one multiplicand is derived, and means (71–75) for multiplying each of said products by an associated coefficient and by a predetermined harmonic of said carrier frequency to form a plurality of modulated weighted products, said decision forming means including data recovery means (14, 17) for forming a decision as to the value of the data symbol represented by said one of said samples in response to said modulated weighted products.

2. The invention of claim 1 wherein said modulated data signal is of the type in which both the carrier phase and amplitude are information-bearing.

3. The invention of claim 2 wherein said modulated data signal is a quadrature amplitude modulated signal.

4. The invention of claims 2 or 3 wherein said decision forming means includes means for applying to said data recovery means said modulated weighted products and a demodulated version of said one of said samples.

5. The invention of claim 4 wherein the harmonic by which each of said products is multiplied is of the form $e^{j[2\pi f_c nT(x-y-1)+\Phi_{x,y}]}$, where $f_c$ is said carrier frequency, n is the sample time index, T is the sample interval, x is the number of decisions in said each of said products, y is the number of complex conjugates of decisions in said each of said products and $\Phi_{x,y}$ is a selected phase angle.

6. The invention of claims 2 or 3 wherein said decision forming means further includes means for combining said one of said samples with said modulated weighted products to form a combined modulated signal, means for demodulating said combined modulated signal and means for applying the demodulated signal to said data recovery means.

7. The invention of claim 6 wherein the harmonic by which each of said products is multiplied is of the form $e^{j[2\pi f_c nT(x-y)+\Phi_{x,y}]}$, where $f_c$ is said carrier frequency, n is the sample time index, T is the sample interval, x is the number of decision in said each of said products, y is the number of complex conjugates of decisions in said each of said products and $\Phi_{x,y}$ is a predetermined phase angle.

8. An arrangement operative during each one of a plurality of successive sampling periods for equalizing a respective one of a succession of samples of a received modulated data signal having a predetermined carrier frequency, said arrangement including feedback means (FIG. 1, 44; FIG. 2, 44') for generating an individual feedback signal associated with said one sample, and decision forming means (FIG. 1—12, 14, 17, 46; FIG. 2—12, 14, 17, 46') jointly responsive to said one sample and its associated feedback signal for forming a decision as to the value of the data symbol represented by said one sample, said one sample and said decision being represented by respective complex numbers, characterized in that said feedback signal includes a plurality of signal products each multiplied by an associated coefficient and by a predetermined harmonic of said carrier frequency, each multiplicand of each signal product being derived from a respective decision formed by said decision forming means during a previous one of said sampling periods, each said respective decision bearing a predetermined temporal relationship to said one sample, at least one multiplicand of individual ones of said signal products being the complex conjugate of the decision from which said one multiplicand is derived.

9. The invention of claim 8 wherein said modulated data signal is of the type in which both the carrier phase and amplitude are information-bearing.

10. The invention of claim 9 wherein said modulated data signal is a quadrature amplitude modulated signal.

11. The invention of claims 9 or 10 wherein said decision forming means includes means (14, 46) for combining said individual feedback signal with a demodulated version of said one sample to form a data recovery input signal, and means (17) responsive to aid data recovery input signal for forming said decision.

12. The invention of claim 11 wherein the harmonic by which each of said products is multiplied is of the form $e^{j[2\pi f_c nT(x-y-1)+\Phi_{x,y}]}$, where $f_c$ is said carrier frequency, n is the sample time index, T is the sample interval, x is the number of decisions in said each of said products, y is the number of complex conjugates of decisions in said each of said products and $\Phi_{x,y}$ is a selected phase angle.

13. The invention of claims 9 or 10 wherein said decision forming means includes means (46') for combining said individual feedback signal with said one sample to form a combined modulated signal, means (12) for demodulating said combined modulated signal and means (17) responsive to the demodulated combined signal for forming said decision.

14. The invention of claim 13 wherein the harmonic by which each of said products is multiplied is of the form $e^{j[2\pi f_c nT(x-y)+\Phi_{x,y}]}$, where $f_c$ is said carrier frequency, n is the sample time index, T is the sample interval, x is the number of decisions in said each of said products, y is the number of complex conjugates of decisions in said each of said products and $\Phi_{x,y}$ is a selected phase angle.

15. A method operative during each one of a plurality of successive sampling periods for equalizing a respective one of a succession of complex samples of a received modulated data signal having a predetermined carrier frequency, said method including the steps of generating an individual feedback signal associated with said one sample, and forming a complex decision as to the value of the data symbol represented by said one sample in response to said one sample and its associated feedback signal, characterized in that said feedback signal includes a plurality of signal products each multiplied by an associated coefficient and by a predetermined harmonic of said carrier frequency, each multiplicand of each signal product being derived from a respective decision forming during a previous one of said sampling periods, each said respective decision bearing a predetermined temporal relationship to said one sample and at least one multiplicand of individual ones of said signal products being the complex conjugate of the decision from which said one multiplicand is derived.

16. The invention of claim 15 wherein said modulated data signal is of the type in which both the carrier phase and amplitude are information-bearing.

17. The invention of claim 16 wherein said modulated data signal is a quadrature amplitude modulated signal.

18. The invention of claims 16 or 17 wherein said decision forming step includes the steps of combining said individual feedback signal with a demodulated version of said one sample to form a data recovery input signal, and forming said decision in response to said data recovery input signal.

19. The invention of claim 18 wherein the harmonic by which each of said products is multiplied is of the form $e^{j[2\pi f_c nT(x-y-1)+\Phi_{x,y}]}$, where $f_c$ is said carrier frequency, n is the sample time index, T is the sample interval, x is the number of decisions in said each of said products, y is the number of complex conjugates of decisions in said each of said products and $\Phi_{x,y}$ is a selected phase angle.

20. The invention of claims 16 or 17 wherein said decision forming step includes the steps of combining said individual feedback signal with said one sample to form a combined modulated signal, demodulating said combined modulated signal and forming said decision in response to the demodulated combined signal.

21. The invention of claim 20 wherein the harmonic by which each of said products is multiplied is of the form $e^{j[2\pi f_c nT(x-y)+\Phi_{x,y}]}$, where $f_c$ is said carrier frequency, n is the sample time index, T is the sample interval, x is the number of decisions in said each of said products, y is the number of complex conjugates of decisions in said each of said products and $\Phi_{x,y}$ is a selected phase angle.

22. A method for use in a receiver of the type in which a decision is formed during the $n^{th}$ one of a plurality of successive periods of duration T, said decision being formed by quantizing a respective demodulated sample of a received complex modulated data signal having a carrier frequency $f_c$, both the carrier amplitude and phase of said signal being information bearing, said decision being represented by a complex number $\hat{A}(n)$, said method including the steps of combining a feedback signal V(n) with said sample to form a signal Y(n) and forming said decision in response to said signal Y(n), said method characterized in that said signal V(n) includes the terms $$\sum_{(j_1,j_2)} B_{j_1,j_2}^{(1)*}(n) \hat{A}(n-j_1)\hat{A}(n-j_2)e^{j[2\pi f_c nT + \Phi_{2,0}]}, \text{ and}$$

$$\sum_{(j_3,j_4)} B_{j_3,j_4}^{(2)*}(n) \hat{A}(n-j_3)\hat{A}(n-j_4)^* e^{-j[2\pi f_c nT - \Phi_{1,1}]},$$

where * indicates complex conjugate and $\Phi_{2,0}$ and $\Phi_{1,1}$ are selected phase angles, the coefficients $$B_{j_1,j_2}^{(1)*}(n) \text{ and } B_{j_3,j_4}^{(2)*}(n)$$

having respective values associated with said decision $\hat{A}(n)$, and the index pairs $(j_1,j_2)$ and $(j_3,j_4)$ having respective sets of predetermined values.

23. The invention of claim 22 comprising the further steps forming a signal $\hat{E}^*(n)$ in response to said signal Y(n) and said decision $\hat{A}(n)$, and updating the coefficients $$B_{j_1,j_2}^{(1)*}(n) \text{ and } B_{j_3,j_4}^{(2)*}(n)$$

in accordance with $$B_{j_1,j_2}^{(1)}(n+1) =$$

$$B_{j_1,j_2}^{(1)}(n) + \gamma_1(n)\hat{A}(n-j_1)\hat{A}(n-j_2)\hat{E}^*(n)e^{j[2\pi f_c nT + \Phi_{2,0}]},$$
and
$$B_{j_3,j_4}^{(2)}(n+1) =$$

$$B_{j_3,j_4}^{(2)}(n) + \gamma_2(n)\hat{A}(n-j_3)\hat{A}(n-j_4)\hat{E}^*(n)e^{-j[2\pi f_c nT - \Phi_{1,1}]},$$

$\gamma_1(n)$ and $\gamma_2(n)$ being selected scaling factors.

24. The invention of claim 23 wherein said signal V(n) further includes the term $$\sum_i B_i^{(0)*}(n)\hat{A}(n-i),$$

the coefficients $$B_i^{(0)*}(n)$$

having respective values associated with said decision $\hat{A}(n)$ and the index i having a set of predetermined values, and wherein said method includes the further steps of
updating said coefficients $$B_i^{(0)*}(n)$$

in accordance with $$B_i^{(0)}(n+1) = B_i^{(0)}(n) + \gamma_0(n)\hat{A}(n-i)\hat{E}^*(n),$$

$\gamma_0(n)$ being a selected scaling factor.

25. The invention of claim 22 further characterized in that said signal V(n) further includes at least a selected one of the terms $$\sum_{(k_1,k_2,k_3)} B_{k_1,k_2,k_3}^{(3)*}(n) \hat{A}(n-k_1)\hat{A}(n-k_2)\hat{A}(n-k_3) \, e^{j[4\pi f_c nT + \Phi_{3,0}]},$$

$$\sum_{(k_4,k_5,k_6)} B_{k_4,k_5,k_6}^{(4)*}(n) \hat{A}(n-k_4)\hat{A}(n-k_5)\hat{A}(n-k_6)^* e^{j\Phi_{2,1}}, \text{ and}$$

$$\sum_{(k_7,k_8,k_9)} B_{k_7,k_8,k_9}^{(5)*}(n) \hat{A}(n-k_7)^*\hat{A}(n-k_8)^*\hat{A}(n-k_9) \, e^{-j[4\pi f_c nT - \Phi_{1,2}]}$$

where $\Phi_{3,0}$, $\Phi_{2,1}$ and $\Phi_{1,2}$ are selected phase angles, the coefficients $$B_{k_1,k_2,k_3}^{(3)*}(n), \; B_{k_4,k_5,k_6}^{(4)*}(n) \text{ and } B_{k_7,k_8,k_9}^{(5)*}(n)$$

having respective values associated with said decision $\hat{A}(n)$, and the index triples $(k_1,k_2,k_3)$, $(k_4,k_5,k_6)$ and $(k_7,k_8,k_9)$ having respective sets of predetermined values.

26. The invention of claim 25 including the further steps of
forming a signal $\hat{E}^*(n)$ in response to said signal Y(n) and said decision $\hat{A}(n)$, and
updating the coefficients $$B_{k_1,k_2,k_3}^{(3)*}(n), \; B_{k_4,k_5,k_6}^{(4)*}(n), \; B_{k_7,k_8,k_9}^{(5)*}(n)$$

in accordance with $$B_{k_1,k_2,k_3}^{(3)}(n+1) =$$

$$B_{k_1,k_2,k_3}^{(3)}(n) + \gamma_3(n)\hat{A}(n-k_1)\hat{A}(n-k_2)\hat{A}(n-k_3)\hat{E}^*(n)e^{j[4\pi f_c nT + \Phi_{3,0}]},$$

$$B_{k_4,k_5,k_6}^{(4)}(n+1) =$$

$$B_{k_4,k_5,k_6}^{(4)}(n) + \gamma_4(n)\hat{A}(n-k_4)\hat{A}(n-k_5)\hat{A}(n-k_6)^*\hat{E}^*(n)e^{j\Phi_{2,1}}, \text{ and}$$

$$B_{k_7,k_8,k_9}^{(5)}(n+1) =$$

$$B_{k_7,k_8,k_9}^{(5)}(n) + \gamma_5(n)\hat{A}(n-k_7)^*\hat{A}(n-k_8)^*\hat{A}(n-k_9)\hat{E}^*(n)e^{-j[4\pi f_c nT - \Phi_{1,2}]},$$

$\gamma_3(n)$, $\gamma_4(n)$ and $\gamma_5(n)$ being selected scaling factors.

27. A method for use in a receiver of the type in which a decision is formed during the $n^{th}$ one of a plurality of successive periods of duration T, said decision being as to the value of a respective demodulated complex sample of a received data signal modulated at a carrier frequency $f_c$, both the carrier amplitude and phase of said signal being information bearing, said decision being represented by a complex number $\hat{A}(n)$, said method including the steps of
combining a feedback signal V(n) with said sample to form a signal Y(n) and forming said decision in response to said signal Y(n),
said method characterizd in that said signal V(n) includes the terms $$\sum_{(j_1,j_2)} B^{(1)*}_{j_1,j_2}(n) \hat{A}(n-j_1)\hat{A}(n-j_2)e^{j[4\pi f_c nT + \Phi_{2,0}]}, \text{ and}$$

$$\sum_{(j_3,j_4)} B^{(2)*}_{j_3,j_4}(n) \hat{A}(n-j_3)\hat{A}(n-j_4)^* e^{j\Phi_{1,1}},$$

where * indicates complex conjugate and $\Phi_{2,0}$ and $\Phi_{1,1}$ are selected phase angles, the coefficients $$B^{(1)*}_{j_1,j_2}(n) \text{ and } B^{(2)*}_{j_3,j_4}(n)$$

having respective values associated with said decision $\hat{A}(n)$, and the index pairs $(j_1,j_2)$ and $(j_3,j_4)$ having respective sets of predetermined values.

28. The invention of claim 27 comprising the further steps forming a signal $\hat{E}(n)$ in response to said signal Y(n) and said decision $\hat{A}(n)$, and updating the coefficients $$B^{(1)*}_{j_1,j_2}(n) \text{ and } B^{(2)*}_{j_3,j_4}(n)$$

in accordance with $$B^{(1)}_{j_1,j_2}(n+1) =$$

$$B^{(1)}_{j_1,j_2}(n) + \gamma_1(n)\hat{A}(n-j_1)\hat{A}(n-j_2)\hat{E}^*(n)e^{j[4\pi f_c nT + \Phi_{2,0}]},$$

and $$B^{(2)}_{j_3,j_4}(n+1) = B^{(2)}_{j_3,j_4}(n) + \gamma_2(n)\hat{A}(n-j_3)\hat{A}(n-j_4)\hat{E}^*(n)e^{j\Phi_{1,1}},$$

$\gamma_1(n)$ and $\gamma_2(n)$ being selected scaling factors.

29. The invention of claim 28 wherein said signal V(n) further includes the term $$\sum_i B^{(0)*}_i(n)\hat{A}(n-i),$$

the coefficients $$B^{(0)*}_i(n)$$

having respective values associated with said decision $\hat{A}(n)$ and the index i having a set of predetermined value, and wherein said method includes the further steps of updating said coefficients $$B^{(0)*}_i(n)$$

in accordance with $$B^{(0)}_i(n+1) = B^{(0)}_i(n) + \gamma_0(n)\hat{A}(n-i)\hat{E}^*(n),$$

$\gamma_0(n)$ being a selected scaling factor.

30. The invention of claim 27 further characterized in that said signal V(n) further includes at least a selected one of the terms $$\sum_{(k_1,k_2,k_3)} B^{(3)*}_{k_1,k_2,k_3}(n) \hat{A}(n-k_1)\hat{A}(n-k_2)\hat{A}(n-k_3)e^{j[6\pi f_c nT + \Phi_{3,0}]},$$

$$\sum_{(k_4,k_5,k_6)} B^{(4)*}_{k_4,k_5,k_6}(n) \hat{A}(n-k_4)\hat{A}(n-k_5)\hat{A}(n-k_6)^* e^{j[2\pi f_c nT + \Phi_{2,1}]},$$

and $$\sum_{(k_7,k_8,k_9)} B^{(5)*}_{k_7,k_8,k_9}(n) \hat{A}(n-7)^*\hat{A}(n-k_8)^*\hat{A}(n-k_9)e^{-j[2\pi f_c nT - \Phi_{1,2}]}$$

where $\Phi_{3,0}$, $\Phi_{2,1}$ and $\Phi_{1,2}$ are selected phase angles, the coefficients $$B^{(3)*}_{k_1,k_2,k_3}(n), B^{(4)*}_{k_4,k_5,k_6}(n) \text{ and } B^{(5)*}_{k_7,k_8,k_9}(n)$$

having respective values associated with said decision $\hat{A}(n)$, and the index triples $(k_1,k_2,k_3)$, $(k_4,k_5,k_6)$ and $(k_7,k_8,k_9)$ having respective sets of predetermined values.

31. The invention of claim 30 including the further steps of forming a signal $\hat{E}(n)$ in response to said signal Y(n) and said decision $\hat{A}(n)$, and updating the coefficients $$B^{(3)*}_{k_1,k_2,k_3}(n), B^{(4)*}_{k_4,k_5,k_6}(n) \text{ and } B^{(5)*}_{k_7,k_8,k_9}(n)$$

in accordance with $$B^{(3)}_{k_1,k_2,k_3}(n+1) =$$

$$B^{(3)}_{k_1,k_2,k_3}(n) + \gamma_3(n)\hat{A}(n-k_1)\hat{A}(n-k_2)\hat{A}(n-k_3)\hat{E}^*(n)e^{j[6\pi f_c nT + \Phi_{3,0}]},$$

$$B^{(4)}_{k_4,k_5,k_6}(n+1) =$$

$$B^{(4)}_{k_4,k_5,k_6}(n) + \gamma_4(n)\hat{A}(n-k_4)\hat{A}(n-k_5)\hat{A}(n-k_6)^*\hat{E}^*(n)e^{j[2\pi f_c nT + \Phi_{2,1}]},$$

and

-continued $$B^{(5)}_{k_7,k_8,k_9}(n+1) =$$

$$B^{(5)}_{k_7,k_8,k_9}(n) + \gamma_5(n)\hat{A}(n-k_7)^*\hat{A}(n-k_8)^*\hat{A}(n-k_9)\hat{E}^*(n)e^{-j[2\pi f_c nT - \Phi_{1,2}]},$$

$\gamma_3(n)$, $\gamma_4(n)$ and $\gamma_5(n)$ being selected scaling factors.

* * * * *

UNITED STATES PATENT AND TRADEMARK OFFICE
CERTIFICATE OF CORRECTION

PATENT NO. : 4,181,888
DATED : January 1, 1980
INVENTOR(S) : David D. Falconer

It is certified that error appears in the above-identified patent and that said Letters Patent are hereby corrected as shown below:

Column 4, line 17, "$\theta(n)$" should read --$\hat{\theta}(n)$--; line 18, "$\hat{\theta}(n)$" should read --$\theta(n)$--; line 36, "A(n)" should read --$\hat{A}(n)$--; line 58, "A(n)" should read --$\hat{A}(n)$--. Column 7, line 20, "A(n)" should read --$\hat{A}(n)$--; line 32, "having" should read --being--. Column 8, line 36, "terms" should read --term--. Column 9, lines 40 and 45, in the formula, "$\delta$", all occurrences, should read --$\partial$--; line 48 "-2A" should read -- $-2\hat{A}$--. Column 10, last line, "j" should read -- -j--. Column 13, line 36, "A" should read --$\hat{A}$--. Column 14, line 9, "$(n-1)^{st}$" should read --$(n+1)^{st}$--. Column 16, line 40, "decision" should read --decisions--. Column 17, line 12, "aid" should read --said--; line 53, "forming" should read --formed--. Column 22, line 3, "value" should read --values--; line 14, delete "pl" at the beginning of the line; line 26, "(n-7)" should read --$(n-k_7)$--.

Signed and Sealed this

Seventeenth Day of June 1980

[SEAL]

Attest:

SIDNEY A. DIAMOND

Attesting Officer

Commissioner of Patents and Trademarks